United States Patent [19]

Spector

[11] Patent Number: 5,609,258

[45] Date of Patent: Mar. 11, 1997

[54] WALL HANGER DISPLAYING COMPACT DISC ARRAY

[76] Inventor: Donald Spector, 380 Mountain Rd., Union City, N.J. 07080

[21] Appl. No.: 504,420

[22] Filed: Jul. 20, 1995

Related U.S. Application Data

[63] Continuation-in-part of Ser. No. 173,045, Dec. 27, 1993, which is a continuation of Ser. No. 945,408, Sep. 16, 1992, Pat. No. 5,600,628, which is a continuation-in-part of Ser. No. 821,062, Jan. 16, 1992, abandoned, which is a continuation-in-part of Ser. No. 701,078, May 16, 1991, Pat. No. 5,090,561.

[51] Int. Cl.⁶ ......................................................... A47F 5/00
[52] U.S. Cl. .............................. 211/40; 211/89; 206/308.1
[58] Field of Search .................................. 211/40, 89, 87; 206/308.1, 0.8, 0.84; 248/314; 40/658

[56] References Cited

U.S. PATENT DOCUMENTS

| | | | |
|---|---|---|---|
| 1,719,962 | 7/1929 | Beistle | 206/0.8 |
| 3,044,606 | 7/1962 | Frosh | 206/0.84 X |
| 5,040,687 | 8/1991 | Whittington | 211/40 |
| 5,090,561 | 2/1992 | Spector | 206/308.1 X |
| 5,232,089 | 8/1993 | Kim | 211/40 X |
| 5,351,835 | 10/1994 | Hallgren | 211/40 |
| 5,462,177 | 10/1995 | O'Donnell | 211/40 |

*Primary Examiner*—Robert W. Gibson, Jr.
*Attorney, Agent, or Firm*—Michael Ebert

[57] ABSTRACT

A wall hanger adapted to display an array of compact discs which together constitute a collection of recordings. The hanger includes a backboard mountable on the wall and a layer of sponge-like compressible material laminated to the face of the backboard. Adhered to the face of the layer is a panel of flexible material provided with an array of circular wells in each of which is snugly nested a respective compact disc having a matching diameter whereby the disc is normally retained in the well. To remove any disc on display so that it can be played, the operator has only to press the panel region surrounding the disc with his fingers, thereby compressing the corresponding region of the layer and causing the disc which overlies an uncompressed zone to pop out of its well.

5 Claims, 1 Drawing Sheet

WALL HANGER DISPLAYING COMPACT DISC ARRAY

RELATED APPLICATIONS

The instant application is a continuation-in-part of my application Ser. No. 08/173,045, filed Dec. 27, 1993, entitled "Compact Disc Album," which is a continuation of my application Ser. No. 07/945,408, filed Sep. 16, 1992, entitled "Compact Disc Album," now U.S. Pat. No. 5,600,628 which is in turn a continuation-in-part of my application Ser. No. 07/821,062, filed Jan. 16, 1992, entitled "Improved Compact Disc Package", now abandoned, which in turn is a continuation-in-part of my application Ser. No. 07/701,078, filed May 16, 1991, entitled "Compact Disc Package" (now U.S. Pat. No. 5,090,561). The entire disclosures of these applications are incorporated herein by reference.

BACKGROUND OF INVENTION

1. Field of Invention

This invention relates generally to wall hangers for displaying compact discs, and more particularly to a hanger for displaying an array of compact discs which together represent a collection.

2. Status of Prior Art

Digital techniques are now widely used to make sound and video recordings. Thus when recording music or speech, the analog signal output of the microphone amplifier is sampled and converted into a stream of digital bits that are recorded on magnetic tape and then transferred from the tape to a rotating master disc. The recording on the master disc is in the form of microscopic indentations in a spiral track on one surface of the disc. The master disc is used to create stampers for pressing vinyl records, called compact discs or CD's.

The player for a CD record uses a laser beam optical pick-up and makes no physical contact with the disc. A similar technique is used to make digital video recordings, the resultant video compact discs being referred to as VCD's. As used herein, the term "compact disc" encompasses both CD's and VCD's.

Compact discs are conventionally packaged in a so-called "jewel box" which consists of a rectangular casing having a hinged lid, the casing being molded of transparent, synthetic plastic material. The casing accommodates a plastic cassette in which the compact disc is held in place within the casing.

A conventional jewel box package, because of its relatively complex nature, is expensive to make and assemble. Moreover, the depth of the box for a compact disc is substantially greater than the thickness of the disc itself. This presents a problem; for in a typical retail establishment, shelf and counter space are at a premium, and the dimensions of a conventional jewel box compact disc package impose limits on the number of packages that can be kept in stock.

In my above-identified, copending applications, there is disclosed a compact disc package formed by a panel of flexible material provided with a circular well to receive a compact disc. The well has a diameter matching that of the disc so that the disc is pressed into the well and is snugly nested therein. The disc can be popped out of the well simply by flexing the panel to disengage the disc therefrom. The compact disc has recorded on one side thereof a sound or video recording (CD or VCD), the other side being printable. Printed on the printable unrecorded surface of the other side of the disc and in the region of the panel surrounding this surface is a picture of a character who is related to the subject matter of the recording. Hence a portion of this picture appears on the printable surface of the disc and the remainder on the panel. Printed on the bottom surface of the well is the same portion of the picture. Hence when the compact disc is removed from the well in the panel, one still sees the entire picture.

It is known to frame a compact disc so that it can be displayed on a wall. Thus when a particular CD recording has won an award and more than a million copies have been sold, it is common practice for the winner to gold or platinum-plate the CD and mount it in a display frame to be hung on a wall. But with a hanger of this type, the CD is locked in place and cannot be removed so that it can be played.

In some cases, a group of compact discs, each carrying a different set of recordings, constitute a collection, for the recordings have a common source. Thus the many recordings made decades ago by the Beatles are now classics which are prized by collectors. If most of the records ever made by the Beatles were digitally recorded on a set of compact discs, these discs would constitute a Beatles collection.

Assuming that the proud possessor of this Beatles CD collections would wish to display these CD's on a wall and thereby arouse the envy of those not so fortunate as to own a like collection, he would do so by mounting the CD's in a common frame or wall hanger.

However, the drawback of a conventional hanger of this type is that it deprives the owner of the collection of the ability to play the CD's. Thus should the owner be challenged by a friend as to whether the collection on display included a particular Beatles recording, the owner could not meet this challange by pulling from the hanger and playing in a player the CD containing this recording.

SUMMARY OF INVENTION

In view of the foregoing, the main object of this invention is to provide a hanger for displaying on a wall an array of compact discs which together constitutes a collection, the discs being each removable from the hangers that they may be played.

By the term "collection of recordings" is meant a group of recordings which though different from each other, all come from a common source such as a particular singer or orchestra, or share a common theme. Thus a group of forty recordings made at various times by Frank Sinatra together constitute a collection. And a group of four recordings of Christmas carols sung by different choruses also constitute a collection, for the carols have a common theme.

More particularly, an object of this invention is to provide a wall hanger of the above type in which the compact discs to be displayed can be installed on the hanger without difficulty and can each be removed without difficulty so that the compact discs on display can also be played.

Another object of the invention is to provide a hanger which securely holds in place an array of compact discs without the need to hold or otherwise attach the discs to the hanger and which makes it possible to release a selected disc from the hanger simply by the application of finger pressure thereto.

A significant advantage of a hanger in accordance with the invention is that the array of discs on display can be

3 protectively housed, for the sensitive recording side of the discs is concealed and cannot be touched.

Also an object of the invention is to provide a wall hanger of the above type which can be mass-produced at a low cost.

Briefly stated, these objects are attained in a wall hanger adapted to display an array of compact discs which together constitute a collection of recordings. The hanger includes a backboard mountable on the wall and a layer of sponge-like compressible material laminated to the face of the backboard. Adhered to the face of the layer is a panel of flexible material provided with an array of circular wells in each of which is snugly nested a respective compact disc having a matching diameter whereby the disc is normally retained in the well. To remove any disc on display so that it can be played, the operator has only to press the panel region surrounding the disc with this fingers, thereby compressing the corresponding region of the layer and causing the disc which overlies an uncompressed zone to pop out of its well.

BRIEF DESCRIPTION OF DRAWINGS

For a better understanding of the invention reference is made to the detailed description to follow which is to be read in conjunction with the accompanying drawings of which.

DESCRIPTION OF INVENTION

Figure 1:
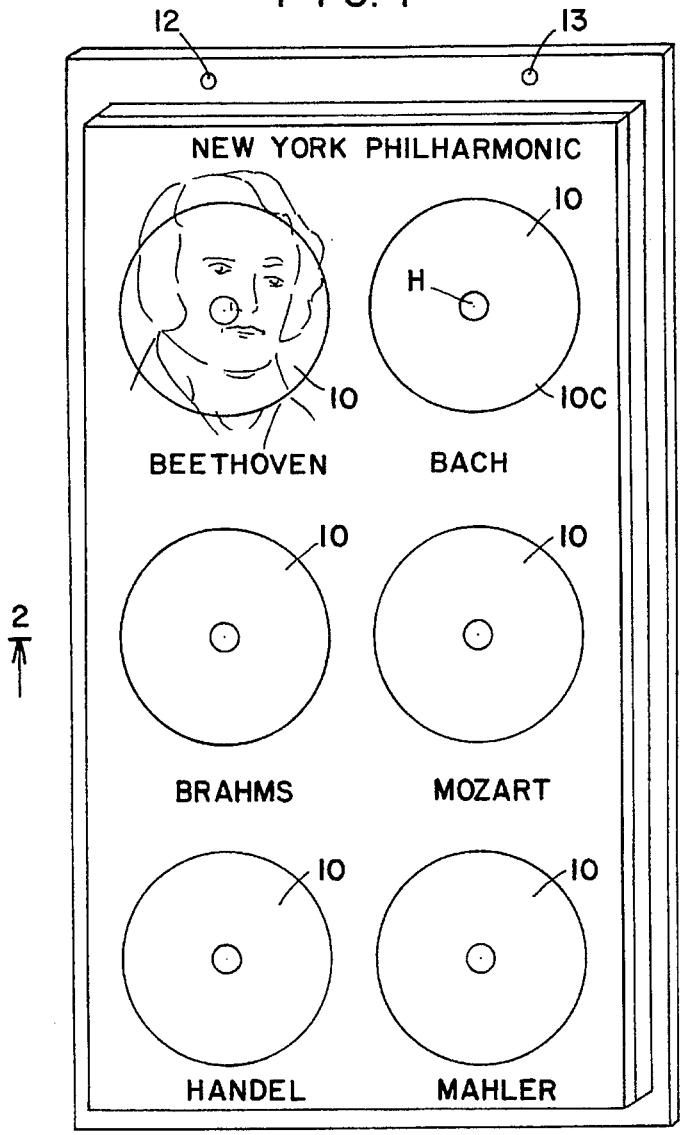
FIG. 1a is a perspective view of a hanger in accordance with the invention for playing an array of compact discs.
Figure 3:
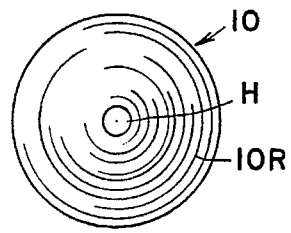
FIG. 3 shows a typical compact disc.
Figure 2:
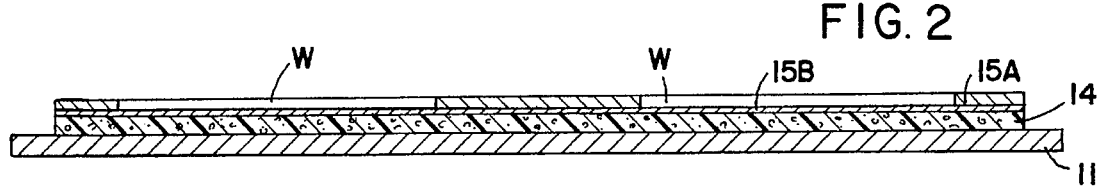
FIG. 2 is a transverse section taken in the plane indicated by line 2—2 in FIG. 1.

Referring now to FIGS. 1 and 2, there is shown a preferred embodiment of a holder in accordance with the invention for displaying an array of six compact discs 10. Each disc as shown separately in FIG. 3 is formed of transparent plastic material whose recording side 10R has a spiral track that is coated with a reflective film. The unrecorded side 10U of the disc which is shown in FIG. 1 is printable. Compact disc 10 is provided with a center hub hole H so that the CD can be mounted on the spindle of an optical player to reproduce the recording.

The six CD's in the array together form a collection of recordings. By way of example, the collection is constituted by a large number of recordings made by the New York Philharmonic Orchestra, one CD containing recordings of Beethoven works, the second of Bach works, the third of Brahms works, the fourth of Mozart, the fifth of Handel and the sixth of Mahler pieces. Hence what is common to these recordings and makes the CD in the array a collection is that all of the recordings of classical compositions were made by the same great orchestra.

The holder for the array of CD's includes a rigid rectangular backboard 11 formed of plywood or similar material, having at its upper edge a pair of mounting holes 12 and 13 so that the holder can be mounted on a wall. In practice, the backboard can be placed in a rectangular frame (not shown). Laminated to the face of backboard 11 is a rectangular layer 14 of a sponge-like compressible material of uniform thickness, such as a flexible polyurethane foam of moderate density. The rectangular dimensions of layer 14 are somewhat smaller than those of the backboard to create an exposed margin on the backboard.

Adhesively bounded to the face of layer 14 is a panel 15 of flexible material, preferably constituted by two plies of paper board 15A and 15B which are laminated together to provide a panel of high strength. The thickness of the upper ply 15A matches that of a compact disc 10, the lower ply 15B being relatively thin and flexible. In practice, the lower ply may be formed by a paper sheet. This layer 14 is sandwiched between backboard 11 and panel 15.

Die cut in upper ply 15A of panel 15 is an array of set circular openings whose diameter matches that of a compact disc to form a well W for snugly nesting the CD.

Thus to install a CD10 in a well W, it is simply pressed into the well so that the periphery of the disc is frictionally engaged by the bank book of the well and the disc is therefore securely held in place. The bottom of well W is defined by a corresponding zone on the surface of the lower ply 15B underlying the upper ply 15A.

The exposed, printable side 10U of each CD nested in a well W is flush with the face of ply 15A of panel 15. Printed on the face of ply 15A are graphics appropriate to the collection of recordings. Thus in the holder illustrated, printed on the exposed side of disc 10 whose other side carries recordings of Beethoven works, is a portrait of Beethoven, a portion of this portrait appearing on the disc and the remaining portion in the region of the panel surrounding the disc.

Figure 4:
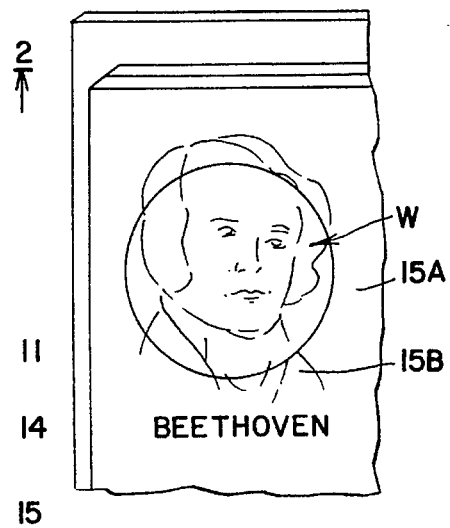
FIG. 4 shows how this disc is nested in a well formed in the top panel of the hanger.

As shown in FIG. 4, that portion of the portrait of Beethoven which appears on the Beethoven disc 10 is also printed on the bottom of well W nesting this disc. Hence when the disc is removed from the well, one still sees the full portrait of Beethoven.

The graphics (not shown) which appear on the other discs and in the surrounding panel regions are appropriate to these discs. Thus printed on the Mozart disc, can be a portrait of this composer. The holder, therefore, not only displays an array of six compact discs which together form a collection, but it also presents an array of portraits of the composers whose works make up the collection.

In order to extract any disc 10 from the array so that it can be played, it is not necessary for an operator to remove the holder from the wall on which it is mounted. All the operator need do is to press in with his fingers that region of panel 15 which surrounds the compact disc selected for removal.

Figure 5:
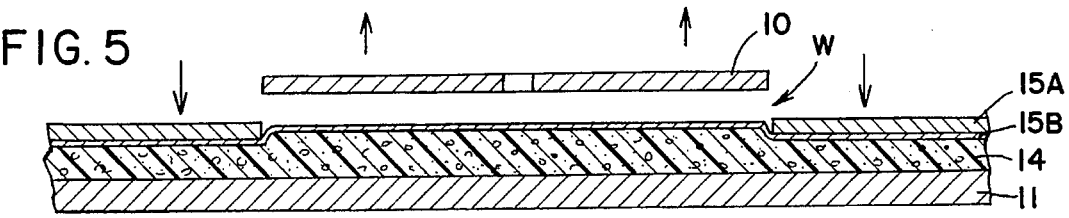
FIG. 5 illustrates how when finger pressure is applied to the region of the hanger surrounding a particular compact disc, this pressure causes the disc to pop out of the well in which it was nested.

This finger pressure, as illustrated in FIG. 5, acts to compress the corresponding region of the compressible layer 14, thereby reducing its thickness. But the circular zone of the layer 14 which underlies the disc nested in well W remains uncompressed; and when the panel region surrounding the selected disc 10 is depressed, this action causes the disc to pop out of the well.

When the fingers are withdrawn from panel 15, layer 14 then resumes its normal thickness and one is therefore able to return the removed disc to its well simply by pressing the disc into the well.

In practice, panel 15 may be formed of cardboard having a top veneer ply of paper of high quality, the wells being die cut in the card board. In this die cut panel, in which the circular openings are open-ended, the bottom of the wells being defined by the face of the foam plastic layer 14 to which the panel is bonded.

While there has been shown a preferred embodiment of a wall hanger in accordance with the invention, it will be appreciated that many changes may be made therein without departing from the spirit of the invention. Thus instead of an array of six compact discs, the holder may be designed to accommodate a smaller or a larger array of discs.

I claim:

1. A wall hanger and an array of compact discs displayed by said hanger comprising:

A. a backboard mountable on a wall;

B. a layer of sponge-like compressible material of uniform thickness laminated to the backboard; and C. a panel of flexible material bonded to the layer which is then sandwiched between the backboard and the panel, said panel having formed therein an array of circular wells in each of which is snugly nested a respective compact disc having a matching diameter; whereby to remove a selected disc from its well, an operator has only to depress a region of the panel surrounding the disc, thereby compressing the corresponding region of the layer and causing the disc to pop out of the well.

2. A wall hanger as set forth in claim 1, in which the discs in the array together constitute a collection of related recordings.

3. A wall hanger as set forth in claim 1, in which the backboard is formed of plywood.

4. A wall hanger as set forth in claim 1, in which the layer is formed of flexible foam plastic material.

5. A wall hanger as set forth in claim 1, in which the panel is formed of cardboard.

* * * * *